April 7, 1925.  1,532,785
A. F. SULZER
PASTER BAND FOR ROLL FILMS
Filed April 8, 1924
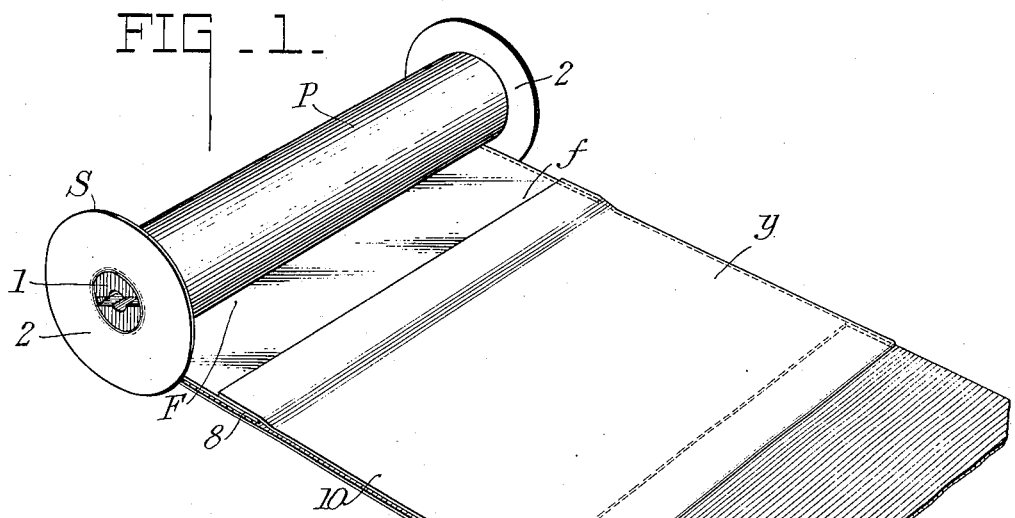
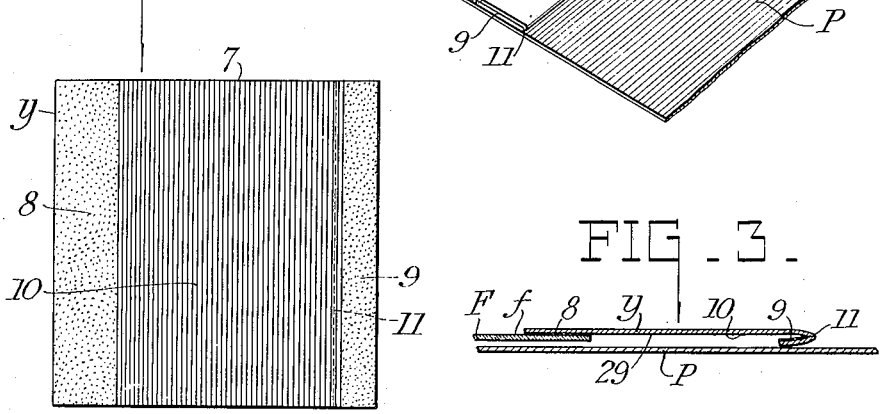
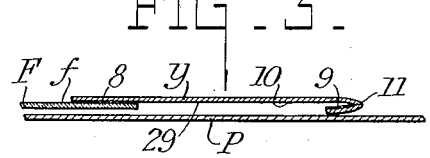
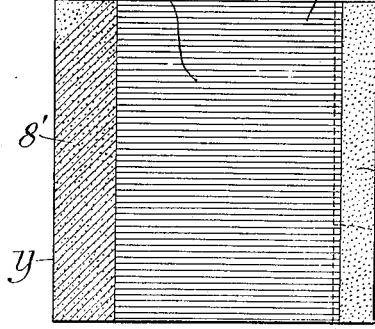
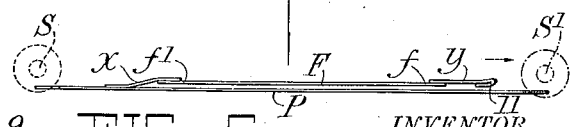
INVENTOR,
Albert F. Sulzer,
BY R. L. Stinchfield
Donald H. Stewart
ATTORNEYS.

Patented Apr. 7, 1925.

1,532,785

UNITED STATES PATENT OFFICE.

ALBERT F. SULZER, OF ROCHESTER, NEW YORK, ASSIGNOR TO EASTMAN KODAK COMPANY, OF ROCHESTER, NEW YORK, A CORPORATION OF NEW YORK.

PASTER BAND FOR ROLL FILMS.

Application filed April 8, 1924. Serial No. 705,126.

*To all whom it may concern:*

Be it known that I, ALBERT F. SULZER, a citizen of the United States of America, residing at Rochester, in the county of Monroe and State of New York, have invented certain new and useful Improvements in Paster Bands for Roll Films, of which the following is a full, clear, and exact specification.

This invention relates to photography, and more particularly to film paster bands for fastening photographic film to the film protecting covering. One object is to provide a paster which is constructed to prevent an adhesive carried by the paster from accidentally adhering to the film protecting covering until it is desirable to fasten these parts together, at which time the construction of the paster permits it to be readily used for joining the desired members; another object is to provide a paster which can be readily wound into the original film cartridge; and another object is to provide a paster which will wind properly through a camera. Other objects will appear from the following specification, the novel features being pointed out in the claims at the end thereof.

As is well known the usual roll film cartridge consists of convolutions of paper, film and sometimes carbon paper with paster bands for holding these parts together. A typical example consists of a sheet of backing paper having a film attached at one end to the backing paper with one paster, and a second paster attached to the other film end but not to the backing paper. All these elements are rolled upon a spool and the free end is fastened by another paster.

It is also customary to provide still another paster for holding the convolutions of the film cartridge together after the film has been exposed, such pasters being stored for convenience between convolutions of the film cartridge until ready for use. Such pasters are liable to become moist or tacky under certain atmospheric conditions in spite of the moisture protecting covering frequently used, and will prematurely adhere to the closest convolution. My present invention is to overcome these difficulties.

The second mentioned paster is used after the film is exposed for fastening the free end of the film to the backing paper so that the film can be developed in a well known type of film tank. It is therefore necessary to provide a paster which may wind freely with the film and backing paper through the camera. Since my invention is particularly useful in connection with this paster, I have shown my invention in the drawing as applied to this paster by way of illustration, although my invention is equally suitable for any paster which is wound into the convolutions of which a film cartridge consists.

The second paster must carry an adhesive by which it may be attached to the backing paper, and the usual type carries a water adhesive. This paster, when wound into the convolutions of a film spool occasionally, due to moisture, becomes tacky or sticky and may prematurely adhere to the backing paper. Since one end of the film slides relatively to the backing paper, this will prevent the film from winding properly through the camera, causing the film or backing paper to buckle, tear or to bind in the camera.

In the drawings, wherein like reference characters denote like parts throughout;

Fig. 1 is a perspective view of a spool with the film and protecting paper partially unwound to show a paster constructed in accordance with, and illustrating one embodiment of my invention;

Fig. 2 is a bottom plan view of the paster illustrated in Fig. 1;

Fig. 3 is an enlarged fragmentary section showing the relation of the paster to the film and protecting paper when spooled;

Fig. 4 is a similar view, with the paster shown as connecting the film and protecting paper;

Fig. 5 is a view of modified form of my invention, a bottom plan view of the paster being shown; and Fig. 6 is a side elevation of a typical film cartridge, unrolled from a spool and having on an exaggerated scale.

In Fig. 6 I show a typical film F mounted at one end $f^1$ to the film protecting paper P by a paster X. A second paster $y$ is fastened only to the film at $f$. In spooling the original cartridge it is wound upon a spool $S^1$ in the direction shown by the arrow. This embodiment relates to paster $y$. In Fig. 1 the film has been wound from spool $S^1$ in a camera to another spool S as the film areas were exposed, and this spool, being removed from the camera is partially unwound to fasten the paster y to the backing paper P preparatory to developing in a tank. A film spool S consisting of the usual core 1 and flanges 2 carries convolutions of film F and film protecting paper P. The film F has attached at its free end a paster y, which, as shown in Fig. 2 consists of a sheet of flexible material 7 such as paper, carrying a band of adhesive 8 at one end, and a second band of adhesive 9 at the other. The adhesive 9 is caused to lie against the intermediate portion 10 which is not coated with adhesive, by bending the paster along a line 11 which lies inside of the adhesive coated area. In paster y the sheet material 7 is made of a water proof material, such as paper or fabric. Such material will be resistant to a water adhesive such as is shown at 8 and 9, and consequently area 9 will not adhere to area 10 even when the adhesive coated area 9 becomes tacky, or damp.

In Fig. 5 in another embodiment of my paster band I provide a fabric 27 sheet such as paper or cloth, which has been waterproofed by coating in any desirable manner with a waterproofing coating 28. This may be applied to one face 29 only or the entire paster can be covered with the waterproofing material as by dipping in a suitable solution. Any well known method may be used for this purpose. Area 8' may consist of a waterless adhesive and area 9 is preferably of the water-adhesive type as used in the paster shown in Fig. 2. When I refer to water-proof paper or to a water-proof coating I mean a surface which may be only substantially waterproof as the present invention requires that this waterproofing be sufficient to be resistant to the water adhesive used on the paster; or, in other words, that when the adhesive becomes moist or tacky it will not prematurely adhere to the water adhesive resisting surface.

In preparing paster y I prefer to use for adhesive area 9 a water adhesive such as is customarily used for pasters, sticker-bands, stamps and the like. A special adhesive which will adhere to the adhesive resisting paster when originally applied may be used or special treatment may be given the paster area to which either of the above mentioned types of adhesive are to be applied. For adhesive area 8 I may use the above mentioned adhesive or an adhesive of the waterless variety 8' (Fig. 5), such as is used in making surgeons tape. The formula for these adhesives are not material for any suitable and well known types may be used. The essential features of my invention are that the paster band shall have an adhesive resisting area adjacent which the adhesive area of the paster may lie until ready for use. This not only prevents premature adhesion to the nearest material it can touch, but the adhesive resisting area of the paster protects the adhesive preventing it from becoming displaced. Moreover, where the adhesive becomes sticky or moist it will not become attached to the paster above described.

Having thus described my invention what I claim as new and desire to secure by Letters Patent is:

1. A photographic film cartridge including a spool, a flexible strip of protective material wound thereon, a flexible strip of film interwound therewith, and a paster band adapted to fasten an end of the film strip to the protective strip, being normally fastened to one of the strips, said paster band having an adhesive resisting area and an adhesive area, the adhesive area being normally folded to lie adjacent the adhesive resisting area.

2. In combination, a flexible protective strip and a film strip adapted to be wound together upon a spool, a paster band adapted to fasten the two strips together, said paster having adhesive and adhesive resisting areas, one adhesive area being pasted against the film, and the other adhesive area being folded to lie adjacent an adhesive resisting area, being adapted to be unfolded for pasting to the protective strip.

3. In combination, a flexible protective strip and a film strip adapted to be wound together upon a spool, a paster band adapted to fasten the two strips together, said paster having adhesive and adhesive resisting areas, one adhesive area being pasted against one of the strips, and the other adhesive being adapted for pasting against the other strip, but normally lying against the adhesive resisting area of the paster.

4. In combination, a photographic film cartridge including a series of convolutions of a film protecting strip and a film strip wound upon a spool, and a paster band which may be used for joining convolutions of the film cartridge comprising an adhesive resisting area and adhesive areas, said paster being adapted for lying between convolutions of the film cartridge with an adhesive area lying adjacent an adhesive resisting area whereby the adhesive area is protected from accidentally adhering to a convolution of the cartridge against which it may lie.

5. In combination, a photographic film cartridge including a series of convolutions of strip material wound upon a spool, and a paster band adapted for use in joining parts of the strip material and to be wound between convolutions of the strip material, said paster band having adhesive and adhesive resisting areas arranged so that the former area lies adjacent the latter area when wound into the convolutions of strip material whereby the adhesive is protected until used.

6. An article of manufacture comprising a film cartridge including a series of convolutions of a film protecting strip and of a film strip, and a paster band stored between convolutions of strip material, the paster band including adhesive and adhesive resisting areas arranged in such relation that the adhesive area may lie adjacent the adhesive resisting area while stored in the film cartridge.

7. A flexible paster band for photographic film cartridges consisting of a flexible sheet of material having adhesive and adhesive resisting areas.

8. A flexible paster band for photographic film cartridges consisting of a flexible sheet of material having a series of parallel areas of adhesive and adhesive resisting material.

9. A flexible paster band for photographic film cartridges consisting of a flexible sheet of material having a medial band of adhesive resisting material with bands of adhesive material on each end of the adhesive resisting material.

10. A paster band for photographic film cartridges comprising a sheet of material carrying adhesive and adhesive resisting areas, the adhesive area being capable of being folded upon the adhesive resisting area.

Signed at Rochester, New York this 2nd day of April 1924.

ALBERT F. SULZER.